US011159578B1

(12) United States Patent
McCown et al.

(10) Patent No.: US 11,159,578 B1
(45) Date of Patent: Oct. 26, 2021

(54) APPARATUS AND METHOD FOR MANAGING DIGITAL IDENTITIES AND CONTROLLING THEIR CORRELATION TO LEGAL IDENTITIES

(71) Applicant: Anonyome Labs, Inc., Draper, UT (US)

(72) Inventors: Steven Harvey McCown, Mapleton, UT (US); Paul Ashley, Toowong (AU); John David Mumford, Portola Valley, CA (US); Greg Clark, San Francisco, CA (US)

(73) Assignee: ANONYOME LABS, INC., Salt Lake City, UT (US)

( * ) Notice: Subject to any disclaimer, the term of this patent is extended or adjusted under 35 U.S.C. 154(b) by 0 days.

(21) Appl. No.: 16/854,594

(22) Filed: Apr. 21, 2020

Related U.S. Application Data

(63) Continuation-in-part of application No. 16/149,998, filed on Oct. 2, 2018, now Pat. No. 10,963,582.

(60) Provisional application No. 63/008,166, filed on Apr. 10, 2020.

(51) Int. Cl.
*H04L 29/06* (2006.01)
*G06F 21/62* (2013.01)

(52) U.S. Cl.
CPC .......... *H04L 63/30* (2013.01); *G06F 21/6218* (2013.01); *H04L 63/0421* (2013.01)

(58) Field of Classification Search
CPC ... G06F 21/6218; H04L 63/083; H04L 63/30; H04L 63/0421
USPC ........................................................ 713/168
See application file for complete search history.

(56) References Cited

U.S. PATENT DOCUMENTS

| 9,372,987 | B1 * | 6/2016 | Ashley | G06F 21/6254 |
| 9,374,689 | B1 * | 6/2016 | Ashley | H04W 4/16 |
| 9,703,986 | B1 * | 7/2017 | Ashley | H04L 63/126 |
| 9,729,519 | B1 * | 8/2017 | Ashley | H04L 51/18 |
| 10,178,106 | B1 * | 1/2019 | Ashley | H04L 63/0407 |
| 10,320,753 | B1 * | 6/2019 | Ashley | H04L 63/0272 |

(Continued)

OTHER PUBLICATIONS

Blockchain's roles in strengthening cybersecurity and protecting privacy Nir Kshetri Telecommunications Policy (2017), https://doi.org/10.101 Bryan School of Business and Economics, The University of North Carolina at Greensboro (Year: 2007).*

*Primary Examiner* — Benjamin A Kaplan
(74) *Attorney, Agent, or Firm* — Cooley LLP

(57) ABSTRACT

A machine has a network interface circuit to provide connectivity to networked machines. A processor is connected to the network interface circuit. A memory is connected to the processor and the network interface circuit. The memory stores cryptographically protected data, an identity management contract and identity stewards specifying individuals to administer the identity management contract. The memory stores instructions executed by the processor to receive a request to identify a legal identity for a digital identity, collect from certain networked machines, via the network interface circuit, consent from the identity stewards, where the consent includes cryptographic identity packets. The cryptographic identity packets are combined to render the legal identity for the digital identity. Transaction data specifying the legal identity for the digital identity is supplied. The transaction data is recorded to a distributed ledger associated with at least a subset of the networked machines.

5 Claims, 13 Drawing Sheets

(56) References Cited

U.S. PATENT DOCUMENTS

| | | | |
|---|---|---|---|
| 2020/0034553 A1* | 1/2020 | Kenyon | H04L 9/3239 |
| 2020/0076602 A1* | 3/2020 | Redpath | H04L 9/3218 |

* cited by examiner

Digital Identity Schema 602
NOTE: the format is { [field name], [data type] }
NOTE 2: the specific entries and types may vary.

{
  { decentralized ID, string},
  { name, string},
  { email, string},
  { phone number, string},
  { public key, string},
  { verifiable claim proof data, string},
  { private key, string }, // optional
  ...
}

Example of an Identity Data Object (with user data matching the DIS) 700

{
  { decentralized ID, "XXXXXXX......"},
  { name, "John"},
  { email, "Doe"},
  { phone number, "1234567890"},
  { public key, "fa2b98f0a8df0af86..."},
  { verifiable claim proof data, "XXXXXX......"},
  { private key, "97df2d8464df8..." }, // optional
  ...
}

FIG. 7

Digital Identity Package 800

{
  { identity disclosure contract, type smart contract (or reference) }
  { Encrypted Partial Legal Identity, type binary },
  { Partial Key, type binary},
  { digital Identity , type Identity Data Object }
}

Encrypted Partial Legal Identity:  LI divided into N parts and encrypted with K

Partial Key:  ephemeral symmetric encryption key divided into N parts

Creating The Partial Key and Identity Values

NOTE: there are may ways to securely divide the encrypted DIP into N parts.  This must be done securely, so that it doesn't create a partial data disclosure before the appropriate steps are taken.

One method of dividing the encrypted values is to do a round-robin selection by giving the 1st byte to the 1st steward, the 2nd byte to the 2nd steward, etc. until all the bytes have been given to the stewards, so that they each have every Nth byte.  Another method would be to use a cryptographic selection algorithm to algorithmically select bytes for each steward until the bytes have all been disseminated.

DIP Packet That Is Transmitted to Stewards 802

{
  { identity disclosure contract, type smart contract or reference },
  { DIP, type string },
  { Digital signature of the above items using the User's Digital Identity's public key, type string}
}

FIG. 8

Identity Management Contract (Smart Contract) 1100

NOTE: this is one of many examples of a smart contract layout that could be tailored to the needs of the AWRMS system participants.

```
{
"id" : "5F64526755 6B5870327335763 8792F42",
"groupName" : "Trusted Identity Group",
"stewards" : [
        "steward1" : "3D4E64526755 6B58703273357538782F",
        "steward2" : "23294A404E635266556A586E32723475",
        "steward3" : "4842264529484 04D635166546A576E5A",
        "steward4" : "EA38792F423F4528482B4D625165 5468",
        "steward5" : "647235753 8782F413F44284 72B4B6250"
    ],
"stewardsRequiredToActivate" : "5",
"protectedInformationDescription" : "Data Information Package",
"invocationActivationSequence" : "Return to AWRMS Management Server",
"notifyTrustedIdentity" : "yes",           (NOTE: options include yes, no, overridable, etc.
"loggingBlockchainID" : "35586E5A72347537782141254 42A472D",
"multiuseInvocation" : "no"
"tokenReceiptTimeframe" : "1 day"
}
```

FIG. 11

APPARATUS AND METHOD FOR MANAGING DIGITAL IDENTITIES AND CONTROLLING THEIR CORRELATION TO LEGAL IDENTITIES

CROSS-REFERENCE TO RELATED APPLICATIONS

This application is a continuation-in-part of U.S. Ser. No. 16/149,998 filed Oct. 2, 2018, and claims priority to U.S. Provisional Patent Application Ser. No. 63/008,166, filed Apr. 10, 2020. The content of each of the referenced patent applications is incorporated herein by reference.

FIELD OF THE INVENTION

This invention relates generally to communications in computer networks. More particularly, this invention is directed towards techniques for operating anonymous digital identities that can be connected to an owner's legal identity only after a legal mandate is presented.

BACKGROUND OF THE INVENTION

The invention is disclosed in the context of the following definitions:

Anonymity With Recourse Management System (AWRMS): The system provides trusted disclosure of a Legal Identity associated with one or more Digital Identities. The Anonymity With Recourse Management System also ensures that the actions it and the Identity Stewards perform are in compliance with the associated Identity Management Contract.

Anonymity With Recourse Management System Application Software: The software (e.g., executable computer code, software development kit, application program interface, etc.) implementing methods whereby the end-user (and their computing devices) interacts with the AWRMS, the Identity Stewards interact with the end-user's devices, the components managing the Identity data and Digital Identity Packages, etc. This set of components is installed on the end-user's computing devices and operates within end-user applications and also within end-user devices at the operating system and/or hardware level. The AWRMS Application Software components may be installed on desktop operating systems (e.g., Windows®, MacOS®, Linux®, etc.), mobile environments (e.g., iOS®, Android®, etc.) and may operate on a wide range of hardware (e.g., desktop, mobile, embedded, 'internet of things', etc.).

Anonymity With Recourse Management System Server: The server system managing the cryptographical, logical, and or physical separation of the relationship between a Legal Identity and one or more Digital Identities. Upon receiving a valid Disclosure Request, the server system coordinates with Identity Stewards to disclose the relationship of the Legal Identity and a Digital Identity to authorized recipients according to the terms of a governing Identity Management Contract.

AWRMS Blockchain: A blockchain or immutable ledger to which are written the activities, agreements, events, identities, members, etc. that participate in the AWRMS operations. This blockchain or ledger contains a verifiable history, timing, and sequence of AWRMS events, which may be used for subsequent verification and validation activities. This blockchain or immutable ledger may be publicly accessible, or it may be private depending on the specific motivation and implementation of the AWRMS. Although termed as 'blockchain' in the singular, some embodiments may employ multiple blockchains or protected storage services.

Blockchain: is a continuously growing list of records, called blocks, which are linked and secured using cryptography. Each block typically contains a cryptographic hash of the previous block, a timestamp and transaction data. By design, a blockchain is inherently resistant to modification of the data. It is an open, distributed ledger that can record transactions between two parties efficiently and in a verifiable and permanent way. For use as a distributed ledger, a blockchain is typically managed by a peer-to-peer network collectively adhering to a protocol for validating new blocks. Once recorded, the data in any given block cannot be altered retroactively without the alteration of all subsequent blocks, which requires collusion of the network majority. (Source: https://en.wikipedia.org/wiki/Blockchain)

Digital Identity: a set of identifying digital attributes (e.g., name, physical address, email address, phone number, credit card number, communication network address, cryptographic keys, unique identifiers, etc.) about a person or thing, which may be different than the attributes of the corresponding Legal Identity.

Digital Identity Package (DIP): a data set containing either actual data or cryptographic references to an Identity Disclosure Contract (smart contract), an Encrypted Partial Legal Identity, a Partial Key, and a Digital Identity. A DIP may be cryptographically signed.

Disclosure Request: a cryptographically signed Disclosure Request contains an official request from a legally authorized source (e.g., law enforcement, court of law, etc.) for the disclosure of a DIP, which (when performed within the AWRMS) will result in the correlation of a Legal Identity with one or more Digital Identities.

Disclosure Requestor: the entity authorized to make Disclosure Requests.

Identity: The characteristics determining who or what a person or thing is. (Source: Oxford Dictionary)

Digital Signature: the digital output of a cryptographic process of digitally or cryptographically signing a subject data set.

Digitally Signed: a data element that has been processed by a digital signing algorithm and for which a Digital Signature has been created.

Identity Credential: a cryptographic token or proof demonstrating what a person or thing is.

Legal Identity: a set of identifying attributes determining who or what a person or thing is, as provided, verified, or asserted by a legal authority or similar official source. A Legal Identity may possess cryptographic keys as elements of its identity definition. A Legal Identity may use cryptographic keys to digitally sign data, Verifiable Claims requests, communications and the like.

Legal Identity Credential Issuer: a legal source that issues and validates identification credentials, which are trusted by a group, society, or population. Credential issuance processes and artifacts may be cryptographically signed and cryptographically verified.

Identity Management Mechanism: a cryptographic access control mechanism (operating on an Identity Steward), or specification thereof, by which an Identity Steward controls access to the DIP that it manages. This mechanism maintains a database of DIPs, validates access requests and credentials, controls how access to DIPs is granted, and controls events that occur to a DIP upon validated access control requests. Each of these functions is governed by an Identity Management Contract.

Identity Management Contract: a cryptographic smart contract that contains terms of service, threshold requirements for DIP disclosure, procedures for disclosing a DIP, and methods for recording Disclosure Request attempts and successful accesses to a DIP.

Identity Steward: One of the participants within an Identity Steward Group that helps control the granting of access to the Digital Identity Package data.

Identity Steward Enrollment Data: a set of data provide by a prospective Identity Steward as part of an enrollment petition or process. This data may be digitally signed by the Identity Steward.

Identity Steward Group: A group of Identity Stewards collaborating to manage permissioned access (in compliance with the Identity Management Contract) to Digital Identity Packages.

Relationship Data: one or more pieces of data or information that specify a relationship between a Legal Identity and a Digital Identity.

The laws of governments provide law enforcement organizations with the authority to investigate crimes and criminal activity in order to keep society safe from wrongdoing, criminals, terrorists, etc. Along with the investigative authority, the laws of governments also provide rules, regulations, and restrictions as to how governmental entities (e.g., law enforcement) may conduct investigations. The balance between the authority and limitations of the investigative processes is further defined by a nation's legal code.

As an example of the balance between legal authority and personal rights, the Fourth Amendment to the United States Constitution guarantees its citizens the right to be secure against unreasonable searches and seizures (e.g., by law enforcement) unless a legal and lawful warrant has been issued by a court of law. Such a warrant must outline the details of what is being sought and potentially seized. The checks and balances covering the warrant process stipulate that while warrants may be requested by law enforcement, they must also be approved by the governing court of law. Without the concurrence of the court of law, no search is authorized and may not be performed. The express intent of this process is to balance the desires of law enforcement with the rights of the people, which is that citizens must be free from searches of their persons, houses, papers, and effects unless probable causes has been demonstrated to the satisfaction of the court.

Upon issuance of a valid warrant in the physical world, law enforcement may open (or break through) the front door of a person's residence in order to search for and retrieve items authorized by the warrant. However, in the digital world where a person's legal identity is often protected through the use of anonymity and pseudonymous identifiers, the issuance of a valid warrant alone does not provide law enforcement with the technical capability to connect an online user's digital identity (e.g., handle) with their legal identity as authorized by the warrant. Law enforcement agencies have complained that the use of anonymity and pseudonymous identifiers prohibits them from conducting legally authorized search activities. This has led law enforcement agencies to demand that anonymity be prohibited, despite the notable individual personal privacy protections it provides, so that they can perform their investigative functions.

If an online user is operating under a handle or friendly name and such is discovered during an investigation and there is no way to connect it with the actual user's real identity, then law enforcement agencies will not be able to question or apprehend a person of interest, which may hinder the investigation. Nevertheless, while the use of anonymous and pseudonymous identifiers can hinder legal investigations, privacy rights groups are also observing that current methods of managing personal data, identity information, or even Know Your Customer (KYC) information puts users at risk when the sites managing that information are unable to guarantee that their data is protected from inadvertent data disclosure. Even when kept secure, making this personal private information available for authorized disclosure using current methods could also open it up to being used illegally (e.g., without a warrant) or even abused by rogue or malicious employees. Privacy rights groups further argue that not allowing users to individually protect their identities and personal information with anonymity or pseudonymous identifiers leaves their data unprotected where it could be illegally exploited by computer hackers who break into encrypted data systems or that such data accessibility could be accidentally triggered by unforeseen computer errors. Since illegal abuse of systems by malicious employees, computer intrusions by hackers, and numerous computer errors have all been demonstrated, it is abundantly clear that personal data is not safe using contemporary data security and protection methods.

In order to protect privacy, users may choose to operate online using alternate identifiers (e.g., pen names, alternate email addresses, one-time-use credit cards, etc.) that are not connectable (e.g., by advertisers, data trackers, etc.) to their legal identities in order to protect their personal data and private communications. By performing different online activities using different anonymous identifiers, users can avoid the correlation of their various online activities and potentially adverse reactions either online or also in the offline world. Some examples of online activities that users would like to avoid correlating are their online research around medical conditions, financial and investment activities, professional employment functions, various hobbies, or even legal political free speech. The privacy benefits of anonymous or pseudonymous activities carry many of the same benefits as with data encryption. Similarly, law enforcement agencies have many of the same concerns as they do about data encryption, since being unable to correlate anonymous or pseudonymous activities with the legal identity of the person performing the activities will also hinder their legally authorized law enforcement investigative activities.

SUMMARY OF THE INVENTION

A machine has a network interface circuit to provide connectivity to networked machines. A processor is connected to the network interface circuit. A memory is connected to the processor and the network interface circuit. The memory stores cryptographically protected data, an identity management contract and identity stewards specifying individuals to administer the identity management contract. The memory stores instructions executed by the processor to receive a request to identify a legal identity for a digital identity, collect from certain networked machines, via the network interface circuit, consent from the identity stewards, where the consent includes cryptographic identity packets. The cryptographic identity packets are combined to render the legal identity for the digital identity. Transaction data specifying the legal identity for the digital identity is supplied. The transaction data is recorded to a distributed ledger associated with at least a subset of the networked machines.

BRIEF DESCRIPTION OF THE FIGURES

FIG. 7 illustrates the Digital Identity Schema and sample Digital Identity data.

FIG. 8 illustrates the Digital Identity Package and the DIP packet that is transmitted to the Identity Stewards.

FIG. 11 illustrates how a Disclosure Request is sent to the AWRMS and relayed to the Identity Stewards with an optional notification to the end-user.

DETAILED DESCRIPTION OF THE INVENTION

The Anonymity With Recourse Management System provides a system and method that uses cryptographic and decentralization methods to store an end-user's Legal Identity and any Digital Identities created for or by the end-user such that the relationship between the Legal Identity and the Digital Identities remains unknown to any part of the AWRMS. Upon receipt and validation of an authorized Disclosure Request, the AWRMS is able to uncover the relationship between an end-user's Legal Identity and any of the end-user's Digital Identities and provide that relationship information to an authorized Disclosure Requestor. This system and method enables end-users to create anonymous Digital Identities and operate anonymously online in order to protect their identity and privacy. Further, this system and method provides law enforcement agencies, after obtaining a legal search warrant or subpoena, the ability to discover the Legal Identity of the end-user controlling a Digital Identity in order to further their investigative duties. This system and method provides a method of détente that balances personal privacy with necessary law enforcement functions by requiring law enforcement to obtain court-sanctioned authorization prior to being able to learn the private relationship between the Legal Identity of an end-user and one or more Digital Identities.

The AWRMS consists of a set of server processors, storage utilities, and communication methods that perform the AWRMS functions. After this computing and processing environment is setup, the AWRMS must enroll multiple Identity Stewards. Each Identity Steward helps maintain the end-user's identity information in an encrypted and decentralized manner.

Figure 1:
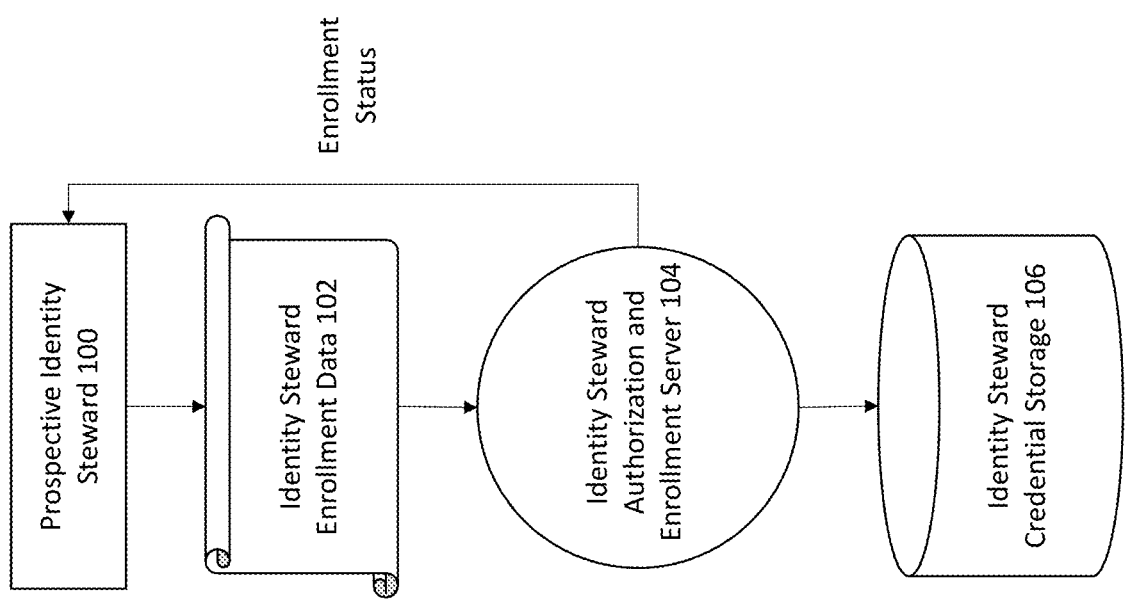
FIG. 1 illustrates the high-level process for enrolling Identity Stewards (e.g., law enforcement, courts, friends, etc.)

FIG. 1 provides a high-level characterization of a process of enrolling Identity Stewards into the AWRMS. A prospective Identity Steward is identified 100. The Identity Steward enrollment process may be initiated by installing an Identity Steward application executing on an Identity Steward device such that the prospective Identity Steward petitions the AWRMS for enrollment acceptance. The petition or request process includes a digitally signed request. In another embodiment, a prospective Identity Steward may be designated by the AWRMS, which sends a digitally signed enrollment invitation to the specified prospective Identity Stewards. Upon petitioning the AWRMS for enrollment or responding to an enrollment invitation, the prospective Identity Steward is prompted to provide a set of Identity Steward Enrollment Data 102, which can contain data items, such as: a unique identifier, a public key, contact information, communication protocols, communication endpoints, etc. The Identity Steward device then uses one or more wired and/or wireless network connections to upload the requested Identity Steward Enrollment data to the Identity Steward Authorization and Enrollment Server 104. The server may have an associated data store for Identity Steward Credential Storage 106. Enrollment actions may be logged to an immutable storage mechanism, such as a blockchain, that has been designated by the AWRMS. This AWRMS Blockchain will likely be a private-permissioned Blockchain.

Prior to enrolling Legal Identity in the AWRMS, an end-user must first create a digital representation of a Legal Identity. In one embodiment, this is performed using self-sovereign identity (SSI) or similar technologies that provide the end-user with the digital ability to send and receive cryptographically verifiable and secure communications, encrypt and decrypt data, as well as, the ability to digitally-sign data and verify digital signatures of digitally signed data.

Figure 2:
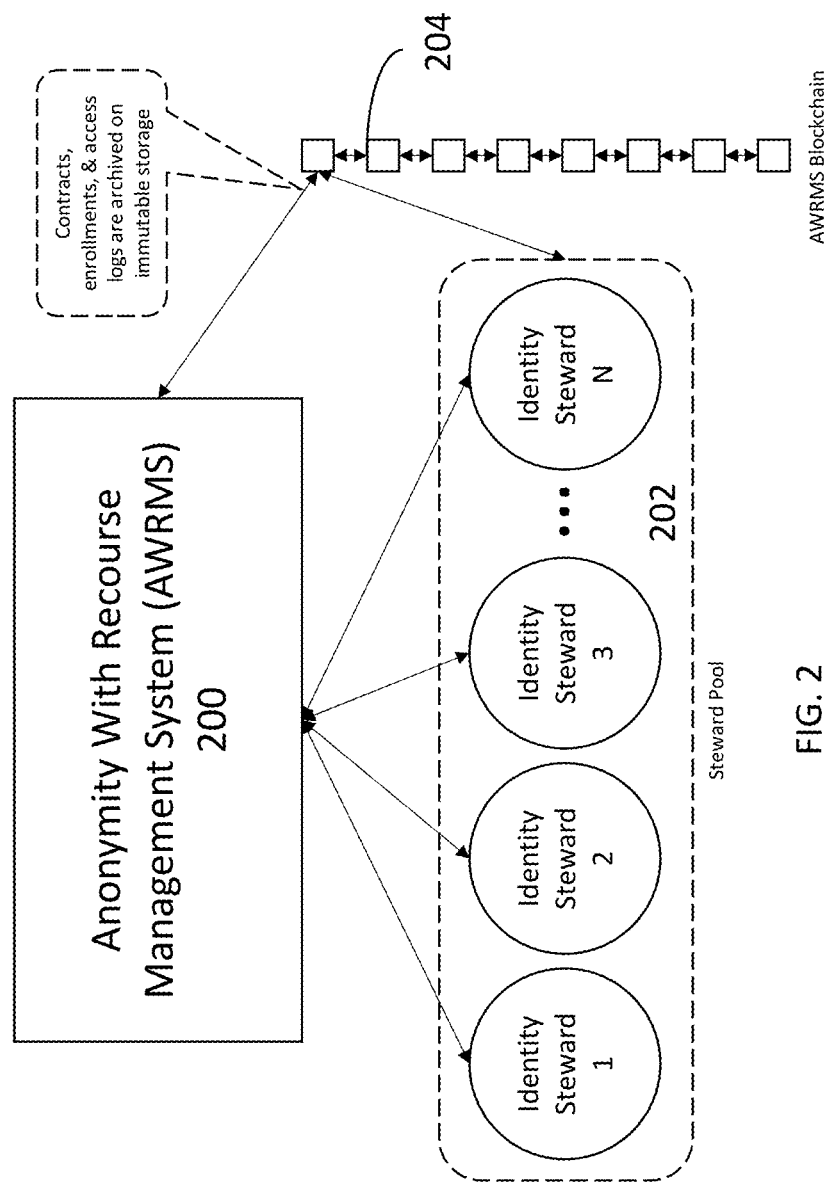
FIG. 2 illustrates the Anonymity With Recourse Management Server architecture overview.

FIG. 2 illustrates the high-level architectural layout of the AWRMS 200 together with a group of Identity Stewards 202 and the AWRMS Blockchain 204. The AWRMS 200 maintains operational control of the AWRMS computing environment and management control of the system as a whole. However, the Identity Stewards are assigned to perform the Identity Steward tasks independent of influence by the AWRMS (aside from system operational management functions) or any external entity other than to receive and process Disclosure Requests and log any activity on the AWRMS Blockchain. The tasks assigned to Identity Stewards are enumerated in the Identity Steward Contract, which requires their performance of holding Digital Identity Package data, evaluating Disclosure Requests, and either disclosing or preventing disclosure of DIP data in accordance with a Digital Identity's Identity Management Contract.

Figure 3:
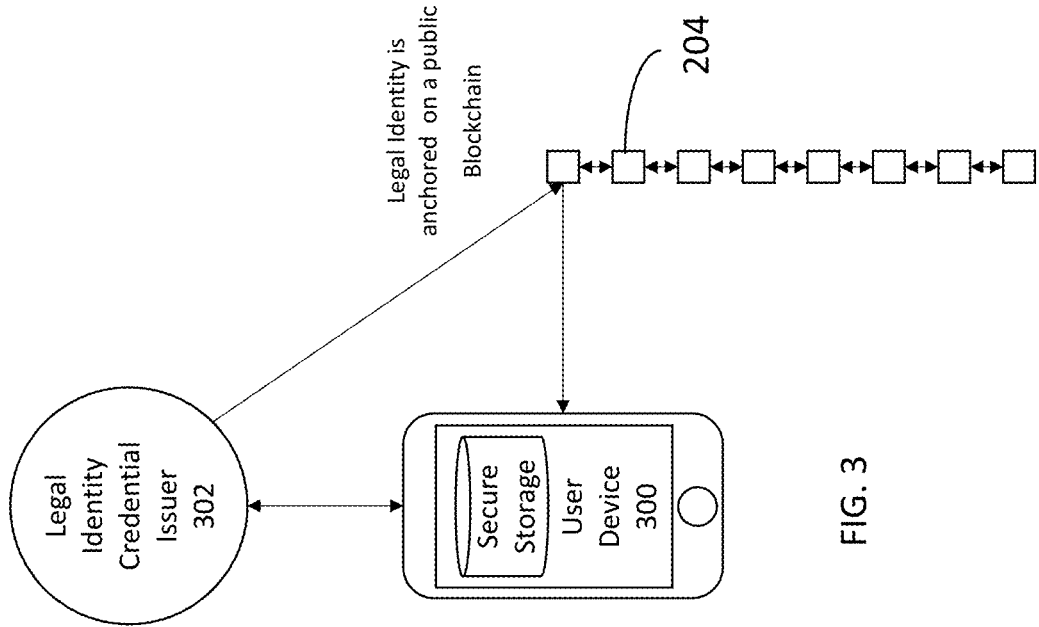
FIG. 3 illustrates the high-level process for enrolling a user device in the Anonymity With Recourse Management System using a centralized storage system and a private permissioned AWRMS Blockchain for anchoring identities.

FIG. 3 is a high-level characterization of the process by which an end-user device 300 receives a Legal Identity Credential from a Legal Identity Credential Issuer 302. Legal Identity Credentials are normally anchored (via a cryptographic reference value or cryptographic data hash) on a public blockchain 204. Anchoring the Legal Identity and the associated Legal Identity Credential on a public blockchain enables the end-user to make public assertions using the credential such that they can be verified by recipients that validate such assertions.

Figure 4:
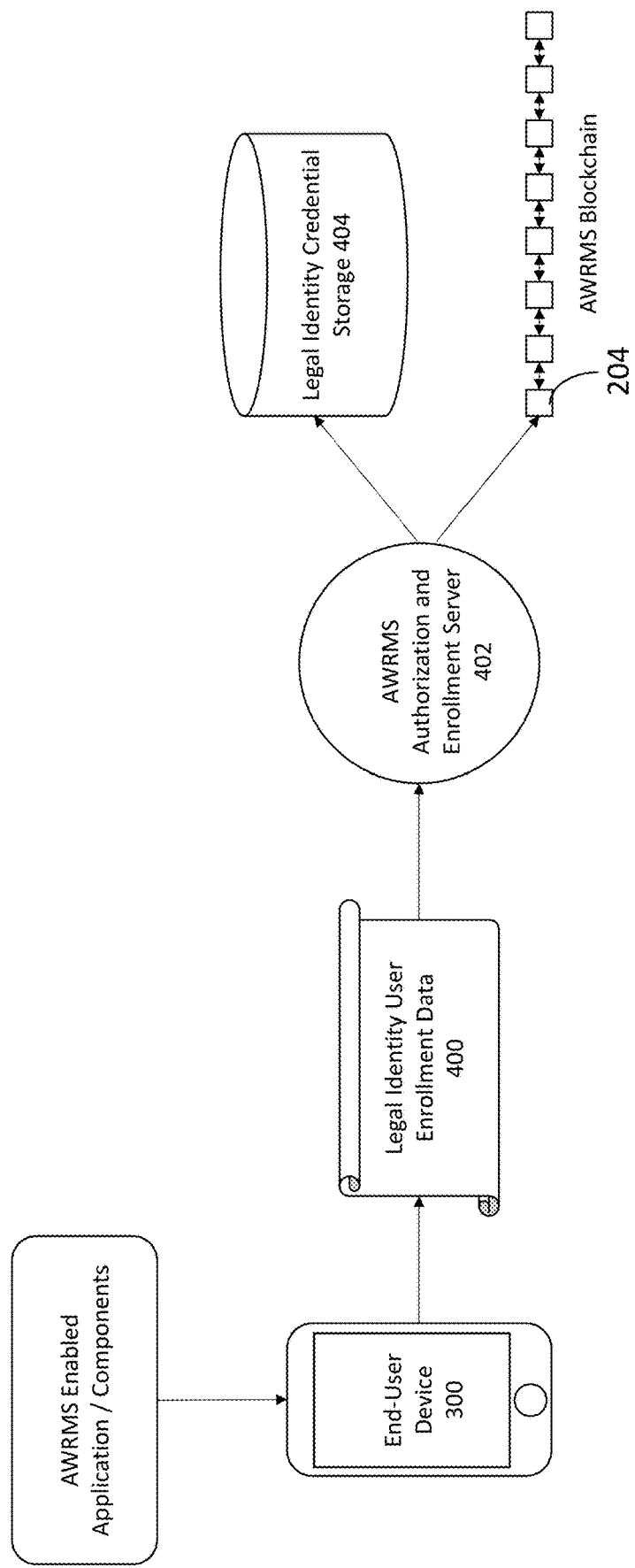
FIG. 4 illustrates how an end-user having created a self-sovereign identity requests and verifies a Legal Identity Credential that is anchored on the blockchain.

FIG. 4 is a high-level characterization of enrolling a user's Legal Identity in the AWRMS. An AWRMS-enabled client application is loaded onto an end-user device 300. In one embodiment, an end-user may overtly perform the steps necessary to enroll in the AWRMS. In another embodiment, the AWRMS enrollment may be performed on the user's behalf through an AWRMS-enabled app, although onboarding apps should get the user's consent prior to enrollment. In another embodiment, a system with which the end-user is operating may initiate the enrollment process on the user's behalf, ensuring the end-user's consent before any enrollment takes place. As part of the client application installation process, the client creates cryptographic keys that enable it to digitally sign and encrypt/decrypt information. The client application prompts the user for their Legal Identity information 400. The client device uses wired and/or wireless network connections to upload the identity data to an AWRMS Authorization and Enrollment server 402, which may have associated Legal Identity Credential Storage 404. The Legal Identity Credential Storage 404 may be part of server or it may be a different machine in network connection with server. In this embodiment, the AWRMS Blockchain 204 includes a trusted reference to a Legal Identity, an Identity Steward Contract, and a listing of Identity Stewards 1 through N. It may also include an Identity Steward Group and an AWRMS Server identifier. Identity Management Contracts, Identity Steward Contracts, enrollments, access logs, etc. are archived on the AWRMS Blockchain 204.

Figure 5:
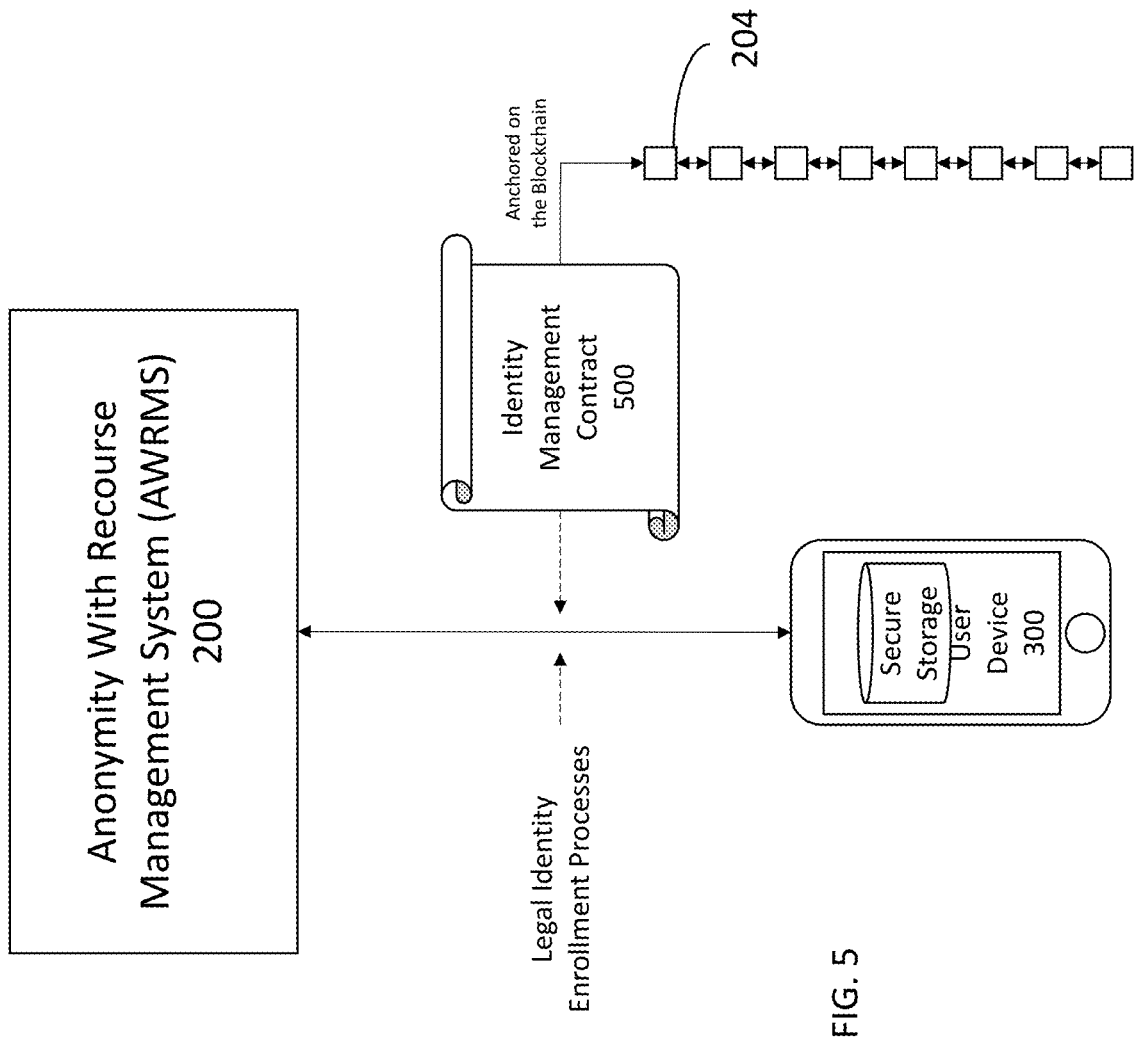
FIG. 5 illustrates how an end-user enrolls a Legal Identity in the Anonymity With Recourse Management System with terms of service covered by an Identity Management Contract

FIG. 5 is a high-level characterization of the process by which an end-user enrolls Legal Identity information in the AWRMS. As part of this enrollment process, the AWRMS 200 provides an Identity Management Contract 500 to the end-user device 300. The Identity Management Contract 500 describes key elements, such as: the AWRMS terms of service, what data is collected, privacy policy, data handling policy, disclosure policy, revocation policy, etc. The end-user can cryptographically verify the integrity and authenticity of the Identity Management Contract by validating it against its anchored entry on the AWRMS Blockchain 204.

Figure 6:
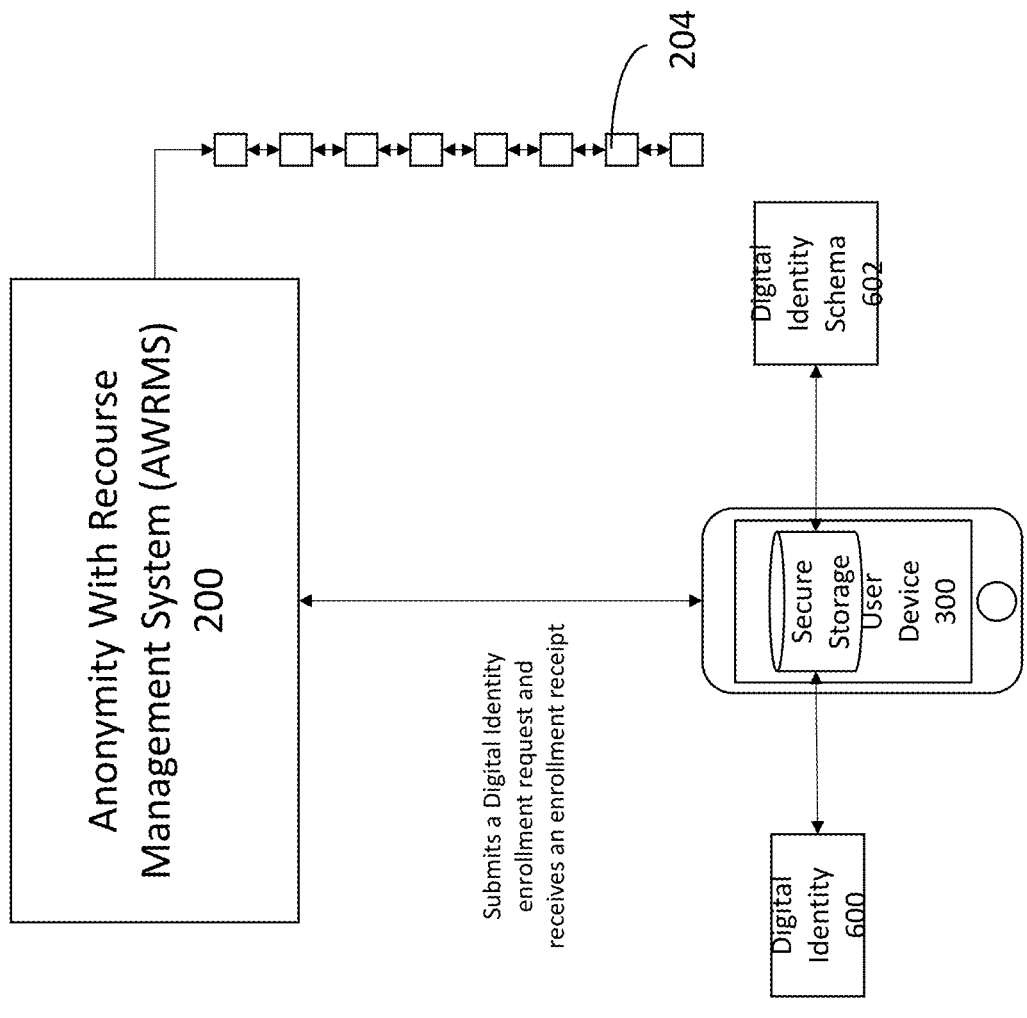
FIG. 6 illustrates how a Digital Identity's enrollment is initiated with the AWRMS and that action is logged on the blockchain.

FIG. 6 is a high-level characterization of the process by which an end-user initiates the enrollment of their Digital Identity information in the AWRMS. As part of this enrollment process, the AWRMS 200 provides an Identity Management Contract to the end-user device 300 that describes key elements, such as: the AWRMS terms of service, what data is collected, privacy policy, data handling policy, disclosure policy, revocation policy, etc. The end-user can cryptographically verify the integrity and authenticity of the Identity Management Contract by validating it against its anchored entry on the AWRMS Blockchain 204. The end-user submits a special type of cryptographically signed enrollment request to the AWRMS that does not contain any information about the user's Digital Identity. It is critical that any information sent to the AWRMS does not contain any identifying information regarding the users Digital Identity. After processing the DI enrollment notification, the AWRMS responds with a digitally signed enrollment receipt or cryptographic token. In this embodiment, the end-user is simply notifying the AWRMS that an enrollment of a Digital Identity 600 is taking place. In another embodiment, this step of notifying the AWRMS that a Digital Identity will be enrolled may be omitted, which will keep the AWRMS from knowing how many Digital Identities an end-user may have created, deleted, or transferred to another end-user.

When an end-user enrolls their Digital Identity into the overall AWRMS environment, it explicitly does not provide any Digital Identity details to the AWRMS server, itself. Rather, the Digital Identity information is provided to a set of Identity Stewards in an encrypted, tokenized, and decentralized manner. In order to know which Identity Stewards to communicate with, the end-user requests and receives the set of designated Identity Stewards (Identity Steward Group) from the AWRMS server. The set of Identity Stewards can be obtained if the end-user submitted a Digital Identity enrollment request to the AWRMS server and received an enrollment receipt (or token) or this set of Identity Stewards can be obtained from the AWRMS server during subsequent or separate communications.

In order to submit the Digital Identity information to the Identity Stewards, the end-user must first create a cryptographic Digital Identity Package 602 that contains (among other data items) a digital representation of the relationship between the end-user's Legal Identity and their Digital Identity. Both the Legal Identity and Digital Identity contain either the actual identity information or could also contain a digital reference to the identity information.

FIG. 7 contains a sample of a Digital Identity Schema 602, which specifies the fields necessary to define an Identity, as well as, the data types of each data field. In other embodiments, the actual fields and data types may vary. FIG. 7 also contains a depiction of a DIS 700 that has been populated with sample Identity information.

FIG. 8 illustrates one embodiment of the cryptographically signed Digital Identity Package 800 that will be transmitted to the Identity Stewards. Alternative embodiments may contain additional or different data fields. When preparing to send the Digital Identity information to each of specified Identity Stewards, the end-user creates a separate and unique DIP that will contain customized data unique for each individual Identity Steward 802. If there are four Identity Stewards, then the end-user will create four unique DIPs. DIPs may be encrypted to the public key of the Identity Steward regardless of whether they are using an encrypted channel (e.g., HTTPS). In this embodiment, each DIP contains a reference to the Identity Management Contract to which the end-user has agreed. The Identity Management Contract contains the terms by which the end-user's Identity information will be handled and can include (but is not limited to): a set of disclosure criteria, specifications, terms, methods, and actions to be taken upon disclosure. The Identity Management Contract terms are codified in the DIP, so that the Identity Stewards can know when, how, and under what conditions to disclose an end-user's identity relationship information. The authenticity of the Identity Management Contract may be verified via its referenced Blockchain.

When preparing the DIP, the end-user creates an ephemeral symmetric encryption key. The end-user uses this encryption key to encrypt the end-user's Legal Identity. In one embodiment, the encrypted Legal Identity is added to the DIP. In another embodiment, the encrypted Legal Identity is tokenized by dividing the encrypted binary data into N number of parts where N represents the number of Identity Stewards that will manage the end-user's Digital Identity. If the tokenized encrypted Legal Identity embodiment is used, then one of the tokenized parts is added to each of the Identity Steward's DIP's, such that each DIP has a different tokenized part. there are many ways to securely divide the encrypted DIP into N parts. Care must be taken when tokenizing the encrypted Legal Identity, so that it can't inadvertently leak information before a disclosure is authorized. One method of tokenizing the encrypted Legal Identity data is to do a round-robin selection by adding the first byte to the first DIP, the second byte to the second DIP, etc. until all the bytes have been assigned. Another method is to use a cryptographic selection algorithm to computationally select random bytes for each DIP. Alternative embodiments can implement different tokenization methods. In another embodiment, the tokenized and/or encrypted Legal Identity and/or ephemeral symmetric key may be further encrypted by the public key of the AWRMS.

When preparing the DIP, the previously created ephemeral symmetric encryption key is tokenized using a process similar to that used for the tokenizing the encrypted Legal Identity above and then one tokenized part is added to each of the DIPs.

Figure 9:
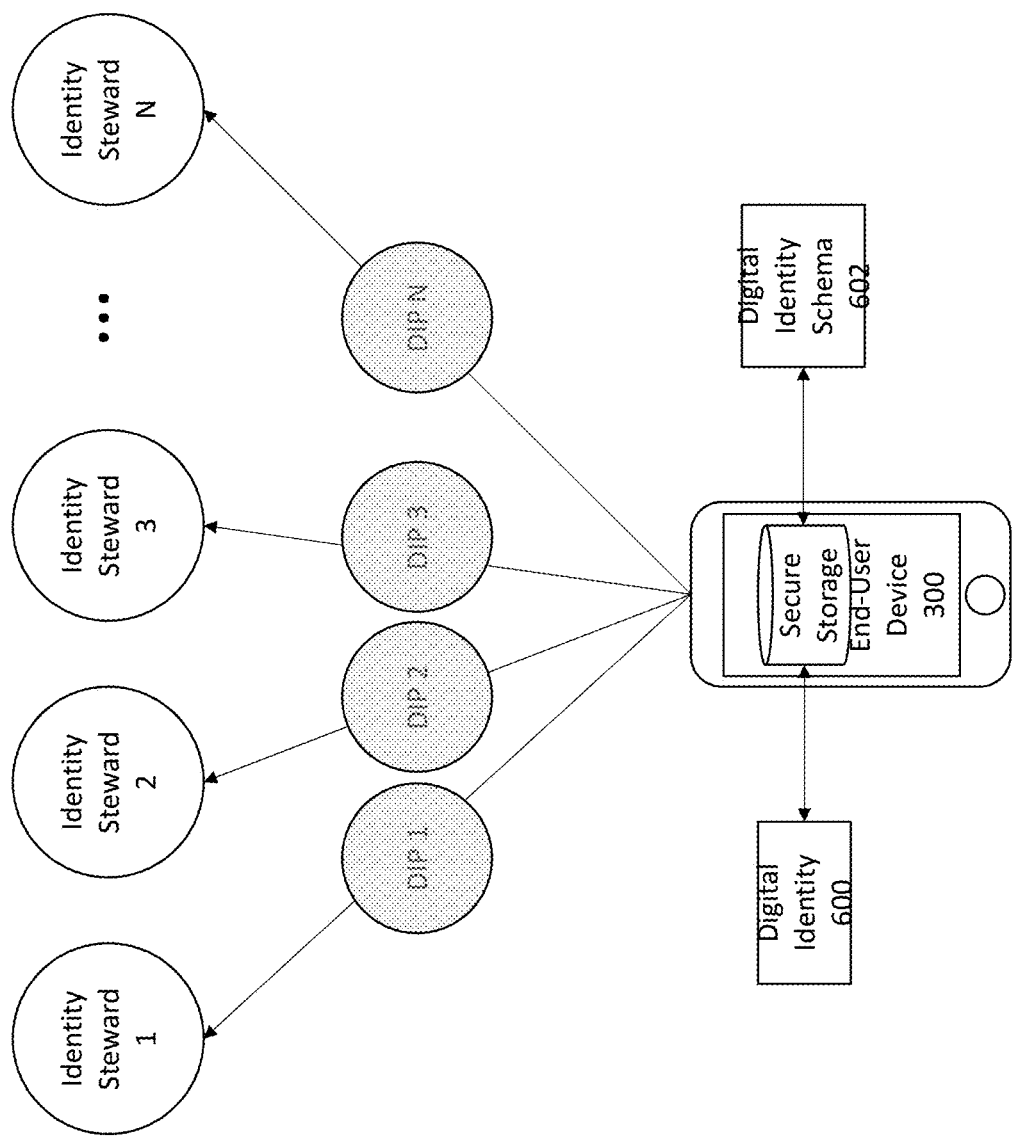
FIG. 9 illustrates how the end-user sends Digital Identity Packages to each of the Identity Stewards.

When preparing the DIP, the Digital Identity information is added to each of the DIPs. Once all the requisite information (including: the Identity Management Contract, the encrypted and tokenized Legal Identity, tokenized ephemeral key, and Digital Identity) has been added to each DIP, the end-user signs each of the DIP's with their Digital Identity's signing key. As shown in FIG. 9, the end-user now securely transmits each of the DIP's to their respective Identity Steward. Upon receipt of their specific DIP, the Identity Stewards store the DIP's in their secure storage. They may also log this event (or a hashed representation thereof) on the AWRMS Blockchain as long as they do not disclose any direct Identity information in the process.

At some point, a law enforcement agency (itself possessing a Legal Identity representing itself as a law enforcement agency, which shall be given to it, directly or indirectly, by the controlling governmental body within whose jurisdiction it resides) petitions a court for the disclosure of the linkage between a Digital Identity and a Legal Identity. Among other things, the law enforcement agency will create a digitally signed and/or encrypted Disclosure Request and submit its information request for approval by a court of law. If the court consents to the disclosure, then the DR is sent to the AWRMS and relayed to the Identity Stewards. In other embodiments, the DR can be sent directly to the Identity Stewards.

Figure 10:
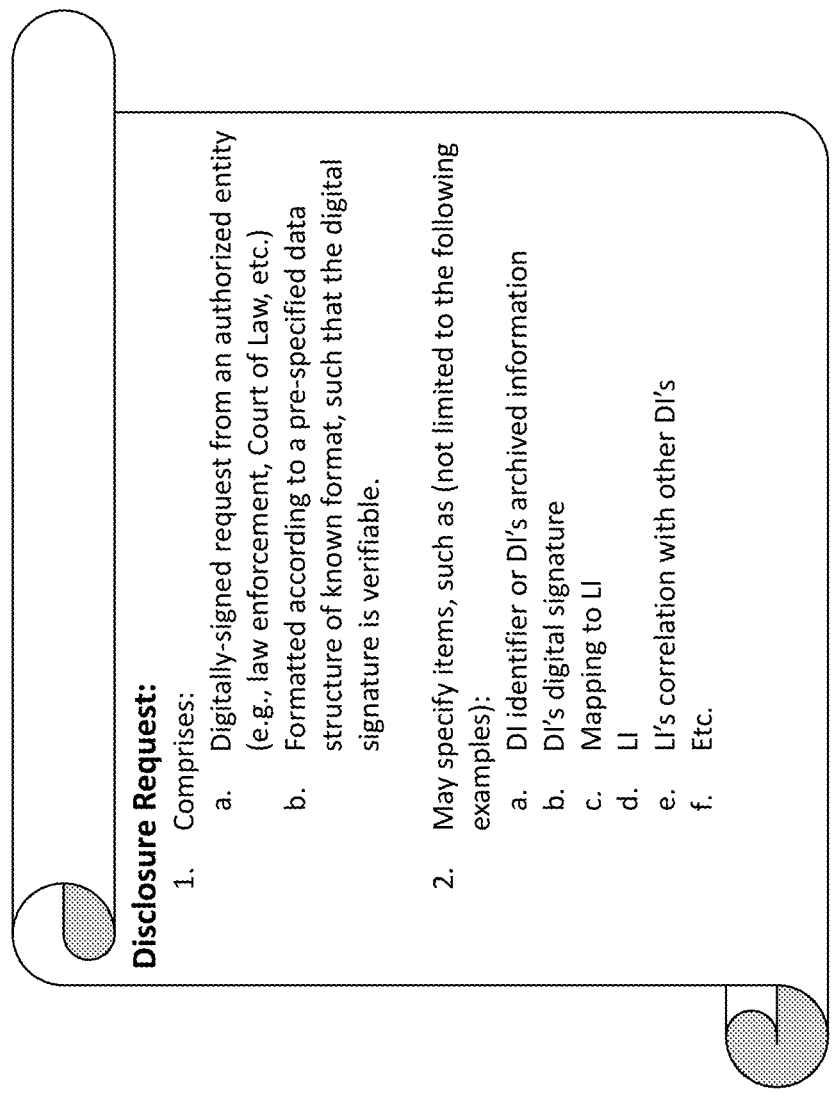
FIG. 10 illustrates a Disclosure Request.

FIG. 10 illustrates the types of information that would be contained in a DR. It is noted that a wide range of identifiers or data elements can be used in a DR. First, a DR will be formatted according to a variety of common information formatting standards, such as JSON, and will contain a set of known data and information types so that they are recognizable by both the submitter and the processors of the DR. The main purpose of submitting a DR is to retrieve the linkage between a DI and an LI. In addition, if a DR requestor submits part of an DI, the AWRMS system can often return other DI or LI elements that the requestor did not previously have. A requestor may create a DR such that it has a DI or one of many of the DI's identifiers with the request that the AWRMS returns the corresponding LI. The data and information requested under the DR may specify a wide array of data and information types, such as any known elements of the DI, LI to DI mapping, correlation with other known identity types, a cryptographic digital signature (which conveys information about the cryptographic digital signing keys), etc. Each DR will be digitally signed by the requestor and by the court.

Each of the AWRMS and the Identity Stewards operate under the terms specified in the Identity Management Contract. FIG. 11 provides an illustration of an Identity Management Contract 1100. The IMC is embodied as a cryptographic digital contract representation ("smart contract") that can be interpreted and cryptographically validated by each party in the AWRMS processes, including the end-user, the law enforcement agencies, the court of law, etc. Each party to the IMC is able to cryptographically digitally-sign the IMC in order to become a signatory of the IMC so that their participation in the contract is subsequently verifiable.

FIG. 11 illustrates a sample formatting layout using JSON, as well as, individual data elements that may be a part of the IMC. Such data fields may contain an IMC identifier, which is a globally unique identifier to provide a permanent unique reference to the IMC. The IMC may also specify a group name for the Identity Steward Group and enumerates the Identity Stewards by their unique identifiers. The IMC may also specify how many of the named Identity Stewards are required to activate the IMC's disclosure terms, a number with is usually unanimous. The IMC may also contain a protected information description describing the information types, relationships, data elements, etc. that are subject to the terms of the IMC. In one embodiment, the IMC may specify that an end-user corresponding to the LI or DI's be securely notified (using cryptography) upon invocation of the IMC's disclosure terms, while in other embodiments, such notification may be withheld. Since the IMC is cryptographically anchored in a blockchain or decentralized ledger, the specific blockchain or ledger is specified in the IMC. The IMC may contain an element specifying whether the IMC's disclosure terms may be activated multiple times or just one single time. The IMC may also specify a timeframe by which each of the Identity Stewards must respond in order for the disclosure request to proceed, after which the disclosure process may terminate without a disclosure. The IMC must also specify the means and methods by which the disclosure is to take place. In one embodiment, each Identity Steward discloses DIP to the AWRMS and the AWRMS deciphers and decodes the subject identity relationship information and conveys it to the DR requestor. In other embodiments, the Identity Stewards may be assigned to disclose a DIP element to one or more locations external to the AWRMS.

Invocation of the Identity Management Contract's disclosure provision may take on numerous forms as determined by the AWRMS Identity Stewards operating in compliance with Identity Management Contract. In some embodiments, activating the Identity Management Contract requires a 100% consensus of the Trusted Identity Steward Group members, while other embodiments may require a lesser number (e.g., 60%) of Trusted Identity Steward Group members to request the invocation of the Identity Management Contract's disclosure provision.

Figure 12:
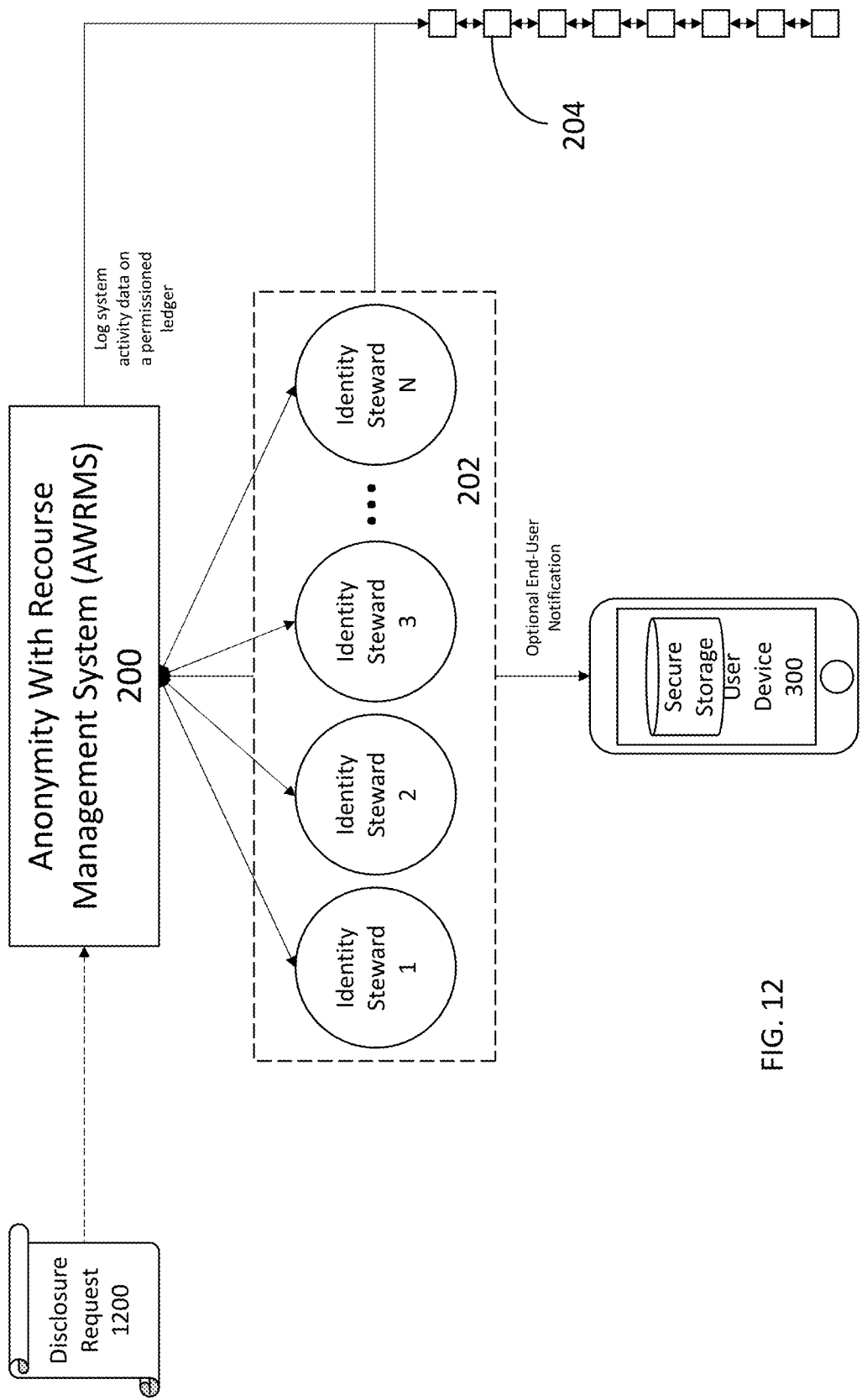
FIG. 12 illustrates an example of a JSON encoding of the details of an Identity Management Contract.

FIG. 12 illustrates the architecture of the AWRMS system and depicts the DR process followed by the DIP disclosure process. In this process, a DR 1200 is sent to the AWRMS 200, which relays the DR to the Identity Stewards 202. Each Identity Steward decodes the DR and cryptographically verifies its validity and authenticity. If the DR is valid and authentic, then the Identity Steward will initiate the disclosure process specified in the IMC. In one embodiment, the Identity Steward securely transmits the DIP to the AWRMS 200. The AWRMS 200 collects all of the required DIPs from each of the Identity Stewards. By deciphering and decoding all of the DIPs, the AWRMS 200 is able to reassemble the Partial Keys (see FIG. 8) into the complete ephemeral symmetric encryption key. Using the complete ephemeral symmetric encryption key, the AWRMS 200 reassembles and decrypts the Encrypted Partial Legal Identity. From the DIP, the AWRMS 200 now possess the full relationship between the LI and the one or more DI's. The AWRMS now complies with the disclosure terms specified in the IMC, which in one embodiment, requires the AWRMS to securely transmit the LI to DI(s) identity and relationship information to the disclosure requestor.

Each major step throughout the enrollment, storage, disclosure request, and actual disclosure processes is cryptographically logged using the AWRMS blockchain 204. The purpose of logging the process steps, any successful or unsuccessful disclosure request attempts, and any completed disclosures is to ensure that full auditing of the AWRMS processes is possible using a record of high integrity, such as an immutable cryptographic ledger or blockchain. This logging process is intended to facilitate a subsequent audit and is intended to detect unauthorized usage, misuse, or illicit misuse of the AWRMS processes and to hold any perpetrators accountable.

Figure 13:
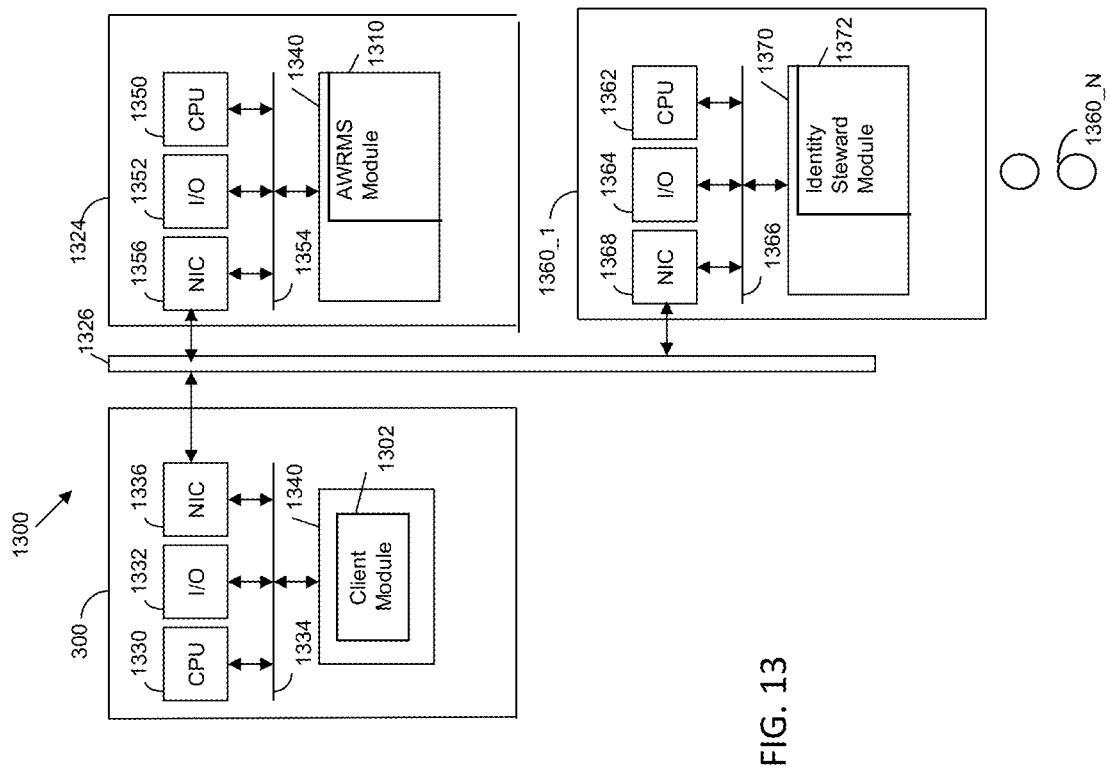
FIG. 13 illustrates a system configured in accordance with an embodiment of the invention.

FIG. 13 illustrates a system 1300 configured in accordance with an embodiment of the invention. The system 1300 includes a user device 300 in communication with a server 1324 via a network 1326, which may be any combination of wired and wireless networks. The user device 300 includes a processor 1330 in communication with input/output devices 1332 via a bus 1334. A network interface circuit 1336 is also connected to the bus 1334 and is configured to provide connectivity with network 1326. A memory 1340 is also connected to the bus 1334. The memory 1340 stores a client module 1302 with instructions executed by processor 1330. The client module 1302 includes instructions to implement operations disclosed herein, such as those performed by a legal entity that has created one or more digital identities.

The server 1324 includes a processor 1350, input/output devices 1352, a bus 1354 and a network interface circuit 1356. A memory 1340 is connected to the bus 1354. The memory 1340 stores an AWRMS module 1310 to implement the AWRMS operations disclosed herein. These operations include communicating with multiple identity steward machines 1360_1 through 1360_N to distribute cryptographic identity packets and to subsequently combine the cryptographic identity packets to render the legal identity for the digital identity. The server 1324 also supplies transaction data specifying the legal identity for the digital identity and records the transaction data to a distributed ledger associated with other networked machines (not shown).

Each identity steward machine 1360_1 through 1360_N includes a processor 1362, input/output devices 1364, a bus 1366 and a network interface circuit 1368. A memory 1370 is connected to bus 1366. The memory 1370 stores an identity steward module 1372 with instructions executed by processor 1362 to implement the identity steward operations disclosed herein, such as storing cryptographic identity packets and then returning them to the server 1324 under appropriate circumstances.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A machine, comprising:
a network interface circuit to provide connectivity to networked machines;
a processor connected to the network interface circuit; and
a memory connected to the processor and the network interface circuit, the memory storing instructions executed by the processor to:
receive an anonymity with recourse management system enrollment package with cryptographically protected data, an identity management contract and identity stewards specifying individuals to administer the identity management contract, wherein the cryptographically protected data includes digital identity details that are not available to the machine;
distribute the cryptographically protected data and the identity management contract to the identity stewards associated with a subset of the networked machines;
receive a request to identify a legal identity for a digital identity,
collect from the subset of the networked machines, via the network interface circuit, consent from the identity stewards, wherein the consent includes cryptographic identity packets,
combine the cryptographic identity packets to render the legal identity for the digital identity,
supply transaction data specifying the legal identity for the digital identity, and
record the transaction data to a distributed ledger associated with at least a subset of the networked machines.

2. The machine of claim 1 wherein the distributed ledger is a blockchain.

3. The machine of claim 1 wherein the consent from the identity stewards includes a predetermined threshold of consenting identity stewards.

4. The machine of claim 1 wherein the request is from a law enforcement official.

5. The machine of claim 1 wherein the memory stores a digital smart contract governing the identity stewards.

* * * * *